US012807247B2

(12) United States Patent
Posthumus

(10) Patent No.: US 12,807,247 B2
(45) Date of Patent: Nov. 24, 2026

(54) TRUCK CAB EXTENSION HAVING FIFTH WHEEL OPENING

(71) Applicant: Multi Coach, LLC, Stephenville, TX (US)

(72) Inventor: Albert Posthumus, Stephenville, TX (US)

(73) Assignee: Multi Coach, LLC, Stephenville, TX (US)

(*) Notice: Subject to any disclaimer, the term of this patent is extended or adjusted under 35 U.S.C. 154(b) by 332 days.

(21) Appl. No.: 18/583,005

(22) Filed: Feb. 21, 2024

(65) Prior Publication Data

US 2024/0286691 A1 Aug. 29, 2024

Related U.S. Application Data

(60) Provisional application No. 63/486,575, filed on Feb. 23, 2023.

(51) Int. Cl.
*B62D 53/08* (2006.01)
*B62D 63/06* (2006.01)

(52) U.S. Cl.
CPC ........... *B62D 53/08* (2013.01); *B62D 63/065* (2013.01)

(58) Field of Classification Search
CPC .... B62D 25/24; B62D 33/06; B62D 33/0612; B62D 53/08
USPC .......................... 296/190.01, 190.02, 190.08
See application file for complete search history.

(56) References Cited

U.S. PATENT DOCUMENTS

| | | | | |
|---|---|---|---|---|
| 6,213,531 | B1 * | 4/2001 | Corey | B62D 33/0612 296/26.08 |
| 7,971,918 | B2 * | 7/2011 | Oriet | B62D 35/001 296/180.2 |
| 11,427,267 | B2 * | 8/2022 | Burrows | B62D 37/02 |
| 12,091,097 | B2 * | 9/2024 | Harmon | E05F 15/605 |
| 2004/0178663 | A1 * | 9/2004 | Whelan | B62D 33/0612 296/190.02 |
| 2020/0369161 | A1 * | 11/2020 | Lee | B60K 16/00 |

* cited by examiner

*Primary Examiner* — Jason S Daniels
(74) *Attorney, Agent, or Firm* — Foley & Lardner LLP

(57) ABSTRACT

Provided herein is a cab extension having a bottom wall configured to be secured to a vehicle and to extend over at least a portion of a hitch supported by the vehicle to define a hitch connection space, where the hitch connection space permits access to the hitch and allows a trailer to be coupled to the hitch while the cab extension is in secured to the vehicle and positioned at least partially over the hitch.

20 Claims, 5 Drawing Sheets

TRUCK CAB EXTENSION HAVING FIFTH WHEEL OPENING

CROSS-REFERENCE TO RELATED APPLICATIONS

This application claims the benefit of priority to U.S. Provisional Patent Application No. 63/486,575, filed on Feb. 23, 2023, the contents of which are incorporated herein by reference in its entirety.

TECHNICAL FIELD

This disclosure relates to vehicles, and in particular, to a cab extension for use with a truck having a fifth wheel hitch.

BACKGROUND OF THE DISCLOSURE

Large hauling vehicles, such as semi-trucks or pick-up trucks, may include a trailer hitch to provide capability to the vehicle to pull a trailer. A fifth wheel hitch is a type of trailer hitch commonly used by large recreational vehicles (RVs) and commercial semi-trucks for towing trailers. The main function of a fifth wheel hitch is to provide a strong and stable connection between the tow vehicle and trailer, allowing for safe and controlled towing. The fifth wheel design allows for greater weight distribution, making it well-suited for towing heavy loads, such as large RVs or commercial semi-trucks. Fifth wheel trailer hitches may be supported by the vehicle chassis and can be accessed from a space above and behind the hitch. A fifth wheel king pin may be inserted into the fifth wheel hitch to engage with a coupler within the hitch, securing the king pin to the hitch and thereby the trailer to the vehicle. When using a fifth wheel hitch, vertical clearance is useful to allow adjustment of the trailer and hitch heights to ensure a proper alignment of the parts before coupling. A latch handle may be used to release the king pin from the hitch.

Cab extensions may be placed on a vehicle body to expand the amount of space available to the vehicle's user. The additional space may be used to provide living or sleeping space for a driver, for example, offering more abundant space for everyday activities than is typically available in a vehicle. If installed on a vehicle with a fifth wheel hitch, larger cab extensions may block access to the vehicle's fifth wheel hitch by overlaying the portion of the vehicle chassis supporting the hitch. The present application provides a design for a cab extension with features that permit access to and use of the fifth wheel trailer hitch while the cab extension is installed.

SUMMARY

In a first aspect, herein is provided a vehicle having a cab extension including features that permit access to a fifth wheel trailer hitch.

In a second aspect, herein is provided a cab extension for use with a vehicle, the cab extension including features that permit access to a fifth wheel trailer hitch when the cab extension is installed.

Other aspects, features, and advantages will become apparent from the following detailed description when taken in conjunction with the accompanying drawings, which are part of this disclosure and which illustrate, by way of example, principles of the inventions disclosed.

In one exemplary embodiment, a vehicle is provided herein having a cab extension including features that permit access to a trailer hitch. The vehicle includes a cab with a chassis supporting the cab, the chassis having a front and a rear end, a hitch supported by the chassis and a cab extension extending from the cab toward the rear end of the chassis, the cab extension having a bottom wall extending over at least a portion of the hitch to define a hitch connection area for receiving a portion of a trailer tongue between the bottom wall of the cab extension and the chassis. At least a portion of the bottom wall of the cab extension may extend at an angle to form the hitch connection area adjacent to the hitch to permit a trailer tongue to couple to the fifth wheel hitch.

In another exemplary embodiment, a cab extension is provided herein, the cab extension having an angled bottom wall, the cab extension configured to couple with a vehicle cab and provide a hitch connection area adjacent to a fifth wheel hitch.

In any of the above embodiments, the angled bottom wall of the cab extension is angled with respect to a chassis, with respect to a top plate of the hitch, with respect to another portion of the bottom wall, or with respect to a horizontal reference. The angled bottom may be angled to extend from between 2 and 45 degrees, or between 5 and 30 degrees, or between 10 and 20 degrees. In some specific embodiments, the angle is about 20 degrees. In some embodiments, only a portion of the bottom wall of the cab extension is angled. In other embodiments, a majority of the bottom wall of the cab extension is angled. In other embodiments, all or nearly all of the bottom wall of the cab extension is angled.

In any of the above embodiments, the cab extension may be supported by the chassis, by the cab, or both. In any of the above embodiments, the cab extension may feature one or more windows and one or more doors. The one or more doors may provide access to the interior of the cab extension, the interior of the cab, or both.

The cab extension may include one or more panels extending downward from the bottom of the cab extension. In some embodiments, the one or more panels are horizontally or vertically hinged such that they may be provided in an open position and a closed position, wherein the open position permits access to the fifth wheel hitch from a side of the vehicle or cab extension. In some embodiments, the one or more panels feature a closure mechanism that includes a locking mechanism to prevent a person from accessing or tampering with the hitch. In some embodiments, the one or more panels are removable.

In another aspect, provided herein is a method of making a cab extension, the method including providing a bottom wall having an angled portion, providing a top wall, providing one or more sidewalls extending from the bottom wall to the top wall such that the walls define an interior cab extension volume, wherein the cab extension is configured to be secured to a cab of a vehicle and, when the cab extension is secured to a cab of a vehicle, the angled portion of the bottom wall is angled at a first angle with respect to a reference plane. In some embodiments, the method further includes securing the cab extension to a cab of a vehicle having a trailer hitch, such that the angled portion of the bottom wall is angled at a first angle with respect to a horizontal reference plane, and thereby forming a hitch connection space between the trailer hitch and the angled portion of the bottom wall. In some embodiments, the hitch connection space is of sufficient size to accommodate a portion of a trailer tongue and permit a connector attached to a trailer tongue to couple with the trailer hitch.

DESCRIPTION OF THE FIGURES

The accompanying drawings and photographs facilitate an understanding of the various embodiments.

DETAILED DESCRIPTION

Cab extensions are oftentimes added to vehicles to increase the usable space provided by the vehicle. For example, cab extensions may be used to provide additional space for activities such as cooking, bathing, eating, relaxing, and sleeping. However, cab extensions are oftentimes limited in size, especially when adapted for use with fifth wheel hitches, which require certain open spaces above and around such hitches.

In operation, fifth wheel hitches provide a stabilizing base for the attachment of a trailer to a vehicle. Fifth wheel hitches feature a substantially horizontal platform and a top plate that provides additional stability to the trailer-vehicle connection. Fifth wheel hitches may feature additional parts that are able to pivot, slide, or otherwise move with respect to the vehicle or the trailer, thereby reducing transmission of forces caused by sudden movements between the vehicle and trailer, such as when the vehicle passes over a bump in a road.

The fifth wheel hitch may be attached to supports on the vehicle, attached to the chassis of the vehicle, or may be placed within a bed of a vehicle. The fifth wheel hitch is configured to receive a connector, such as a king pin, attached to a trailer. A top plate of the fifth wheel hitch guides and supports the trailer tongue during insertion and while the trailer is engaged with the fifth wheel hitch. Alternatively, the fifth wheel hitch may be attached to the trailer and the connector, such as a king pin, may be attached to the vehicle instead. In any case, once attached to the trailer, the fifth wheel hitch is ultimately supported by the vehicle chassis during use, and it should be understood that the present cab extension functions when the hitch is directly attached to the vehicle or when the king pin (or other connector) is attached to the vehicle. Either configuration is equivalent in regards to the present cab extension.

This application refers to a connector or a connecting piece, such as a king pin; however it should be understood that other types of connectors are interchangeable with the king pin, depending on the fifth wheel hitch. For example, the connector used with the fifth wheel hitch may be one or more of a king pin, a trailer ball, a slide, or other connector. The present cab extension should be understood to function with all types of fifth wheel hitches, regardless of the connector type. The king pin slides into the coupler and is held in place until released.

It should also be understood that this disclosure is not limited to fifth wheel trailer hitches, but may be applied to any trailer hitch requiring space above the hitch to function. While the present disclosure refers to a fifth wheel trailer hitch, it should be understood that the cab extension and methods disclosed herein may also be used with gooseneck hitches, fifth wheel couplers, a reese hitch, a slider hitch, and any other type of hitch requiring overhead space.

Figure 1A:
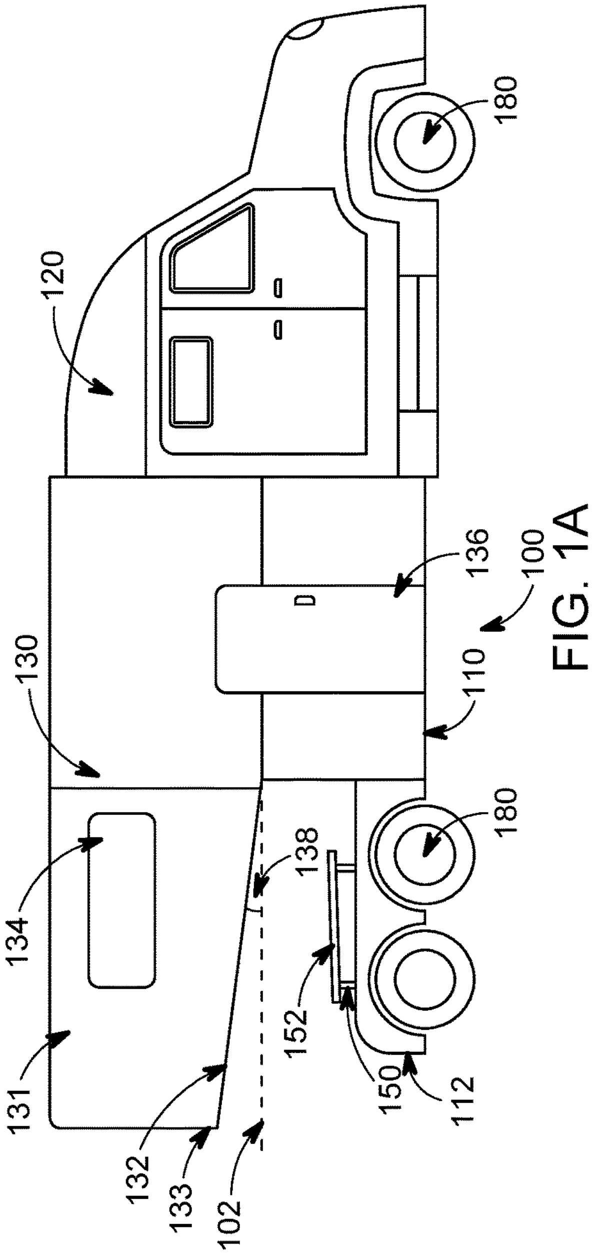
FIG. 1A is a side view of a vehicle schematic, the vehicle having an extended cab extending over a fifth wheel.
Figure 1B:
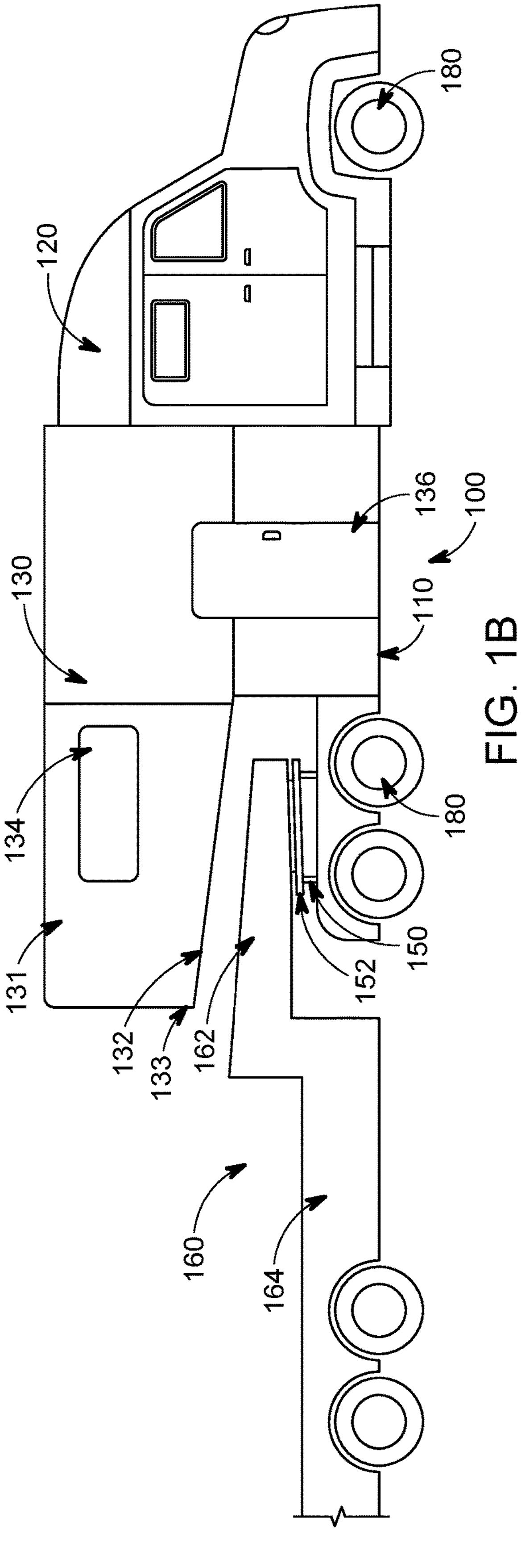
FIG. 1B is a side view of a vehicle schematic, the vehicle having an extended cab extending over the fifth wheel with a trailer attached thereto.

With reference to FIGS. 1A-1B, an exemplary embodiment of a cab extension 130 is employed for use with a fifth wheel hitch. In FIGS. 1A and 1B, the cab extension 130 is depicted attached to a vehicle 100. However, the present application also provides for a cab extension 130 that is not attached to a vehicle. In the illustrated embodiment, the vehicle 100 features a cab 120 and a chassis 110 supporting the cab 120. One or more sets of wheels 180 support the chassis 110 and permit the vehicle to travel. As depicted in the exemplary embodiment, the cab extension 130 extends from the cab 120 toward a rear end of the chassis 112. In FIGS. 1A and 1B, a fifth wheel hitch 150 having a top plate 152 is attached to or otherwise supported by the chassis 110. The cab extension 130 may be directly supported by the chassis 110, supported by the cab 120, or by both the cab 120 and the chassis 110. The cab extension may include support structures for connecting with the chassis 110 or cab 120 such as bars, poles, rods, platforms, and other support structures.

The cab extension may define an enclosed space by one or more of the side walls, a rear wall, a bottom wall, and a roof wall (or top wall). With continued reference to FIGS. 1A-1B, the cab extension features a bottom wall 132, which may serve as a floor for use by passengers or as a bed for storage of cargo or other materials. The cab extension may feature one or more side walls, such as a first side wall 131. The cab extension 130 may also include a second side wall (not shown) opposite the first side wall 131 and a rear wall 133.

Figure 4:
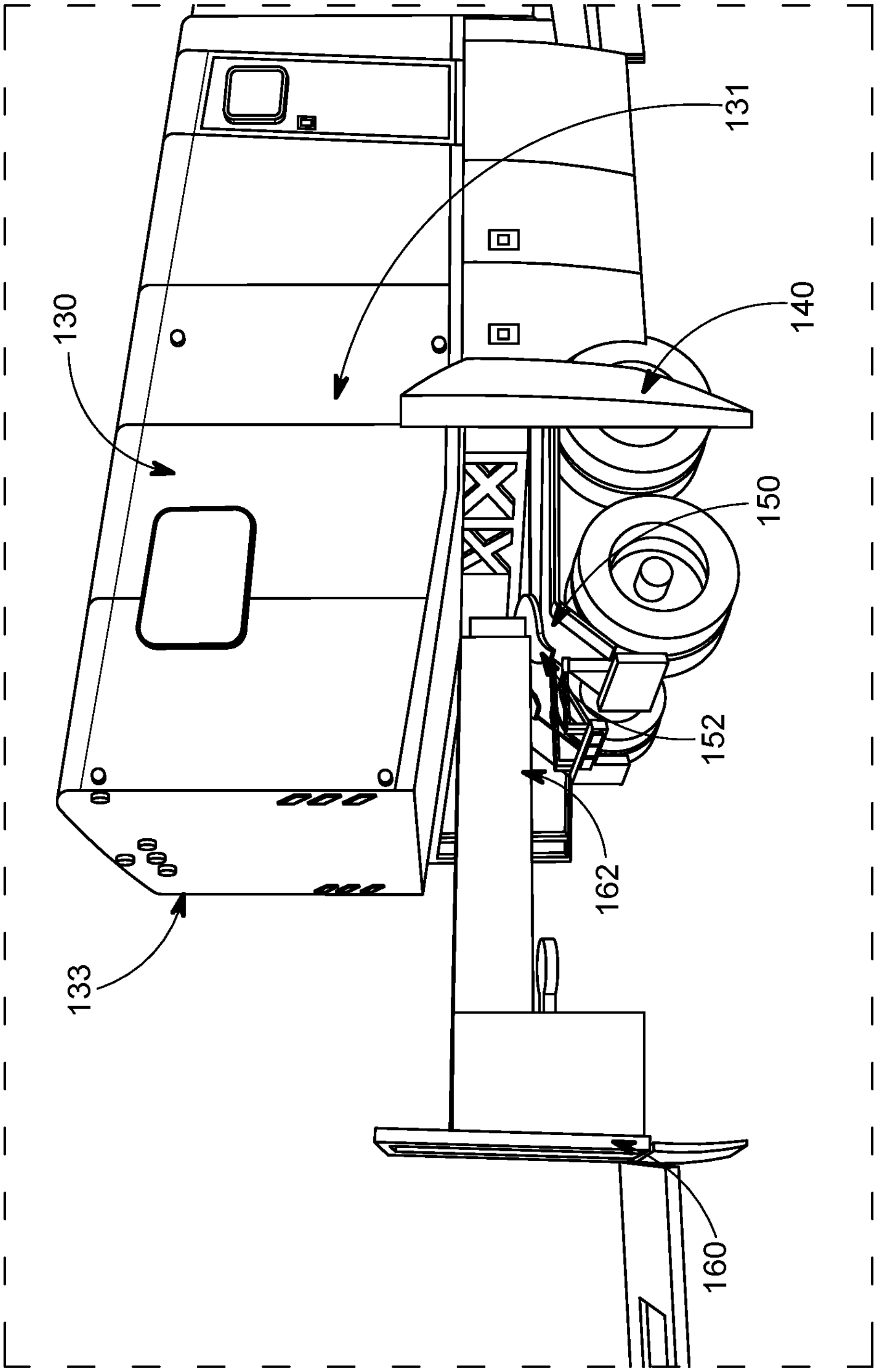
FIG. 4 is a side view of a vehicle having an extended cab with a trailer attached and having the side panels in the open position illustrating a trailer tongue coupled to the fifth wheel of the vehicle.

In the embodiment illustrated in FIGS. 1A and 1B, the bottom wall 132 of the cab extension 130 is angled with respect to a reference, such as a horizontal reference/plane 102. The angle of the bottom wall 138 of the cab extension 130 may also be angled with respect to the vehicle chassis 110, to a portion of an attachable trailer 160, to a top wall of the vehicle or of the cab extension, or with respect to another portion of the bottom wall. For example, as depicted in FIGS. 1B and 4, the angle of the bottom wall 138 provides or otherwise creates a gap/space beneath the bottom wall 132, which may be utilized as a hitch connection zone or space while the cab extension is positioned above the trailer hitch 150. The hitch connection zone defined by the angled portion of the bottom wall permits insertion of a trailer tongue 162 of a trailer 160 between the top plate 152 of the fifth wheel hitch 150 and the bottom wall 132 to couple with the fifth wheel hitch of the vehicle 100 while the cab extension is positioned over the hitch. In other words, when connected to a vehicle 100, the angled portion of the bottom wall 132 of the cab extension 130 permits a trailer 160 to be coupled to the vehicle and for the vehicle to operate with the trailer while the cab extension remains connected to the vehicle.

In addition, the hitch connection zone or space beneath the bottom wall 132 also permits the trailer 160 to move independently of the vehicle 100 without contacting the cab extension 130 while the vehicle is positioned on or is driving across uneven surfaces. For example, when the vehicle 100 is driven up an angled ramp (e.g., driven into a sloped driveway), the vehicle will become angled with respect to the trailer 160. The space provided by the angled bottom wall 132 of the cab extension 130 permits the vehicle to be angled in this way without contacting the trailer tongue 162 with the bottom wall 132 of the cab extension 130, thereby avoiding damage to any of the components. The trailer 160 may feature an enclosed portion, such as a camping trailer or a horse trailer, or may feature an open bed 164 for transporting cargo.

The bottom wall 132 may be angled or may have an angled portion and a flat portion. The angled portion may make up the entirety of the bottom wall 132, or may only be a portion of the bottom wall. The angle 138 of the bottom wall 132 may be may be measured from a reference plane 102. In some embodiments, the reference plane is a horizontal reference plane 102. In other embodiments, the reference line represents an angle of a surface or feature of the trailer 160, such as an upper surface of the trailer tongue 162, though any reference line or plane may be considered. For example, the angle may be measured with respect to another portion of the bottom wall or a top wall of the cab extension. A top plate 152 of the hitch 150 may be used to guide and support the trailer tongue 162 during insertion and while the trailer 160 is engaged with the hitch. In some embodiments, the top plate 152 of the hitch 150 acts as the reference plane for determining the angle of the bottom wall 132 of the cab extension 130.

According to some embodiments, the angle presented by the angled portion of the bottom wall 138 may be between 2 and 45 degrees. In other embodiments, the angle 138 may be between 5 and 30 degrees, or from 10 to 20 degrees, or whatever angle is necessary to accommodate the trailer tongue 162 and, in particular, the relative movement between the bottom wall 132 and the tongue 162. Indeed, the angle 138 will greatly depend on the dimensions of the trailer tongue 162 that is desired to be inserted into the space between the fifth wheel hitch 150 and the bottom wall 132 of the cab extension 130. For example, thicker or bulkier trailer tongues require a steeper angle. According to one embodiment, the angle 138 is about 20 degrees.

Figure 2:
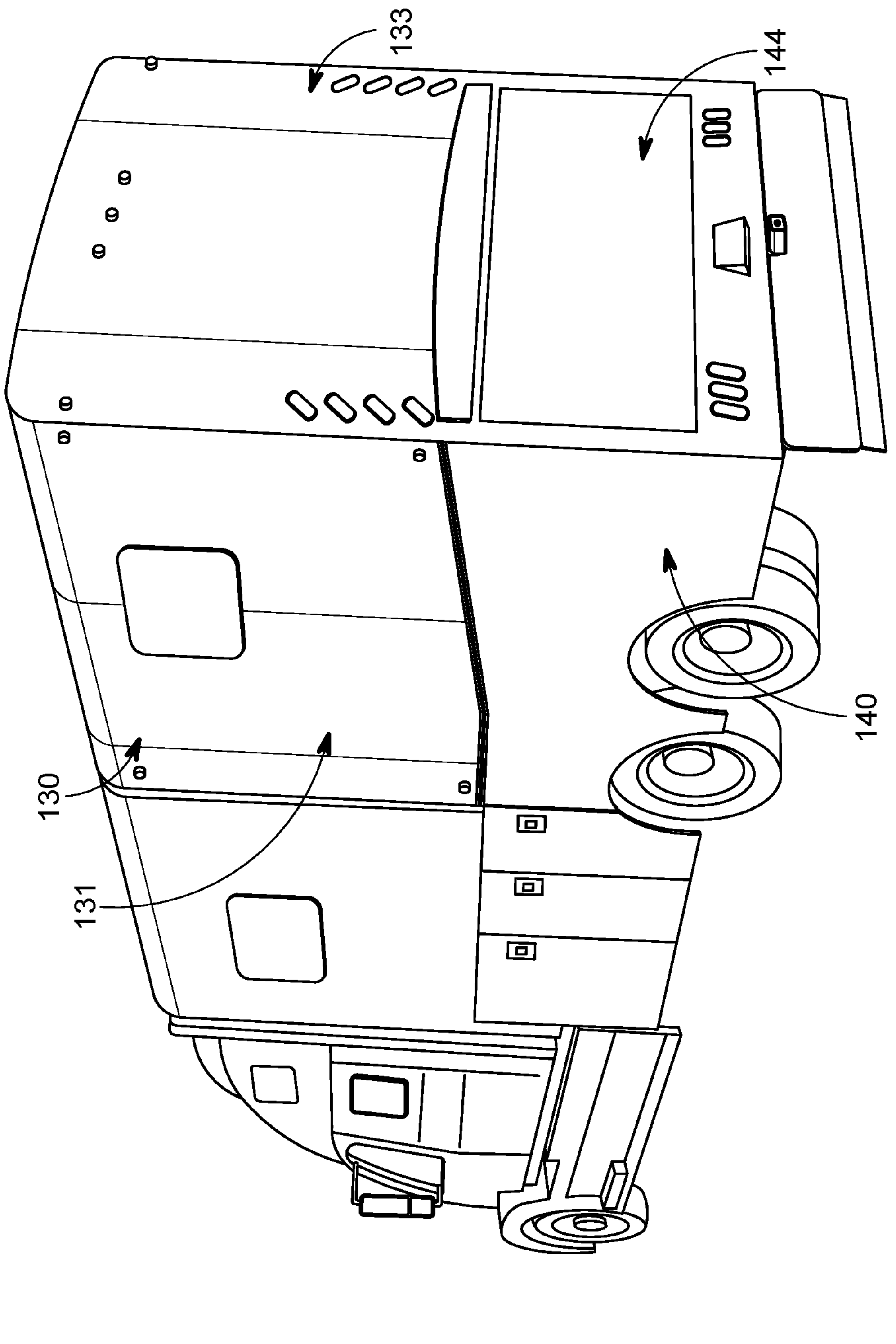
FIG. 2 is a rear view of a vehicle having an extended cab with side panels in a closed position to conceal the fifth wheel hitch.
Figure 3:
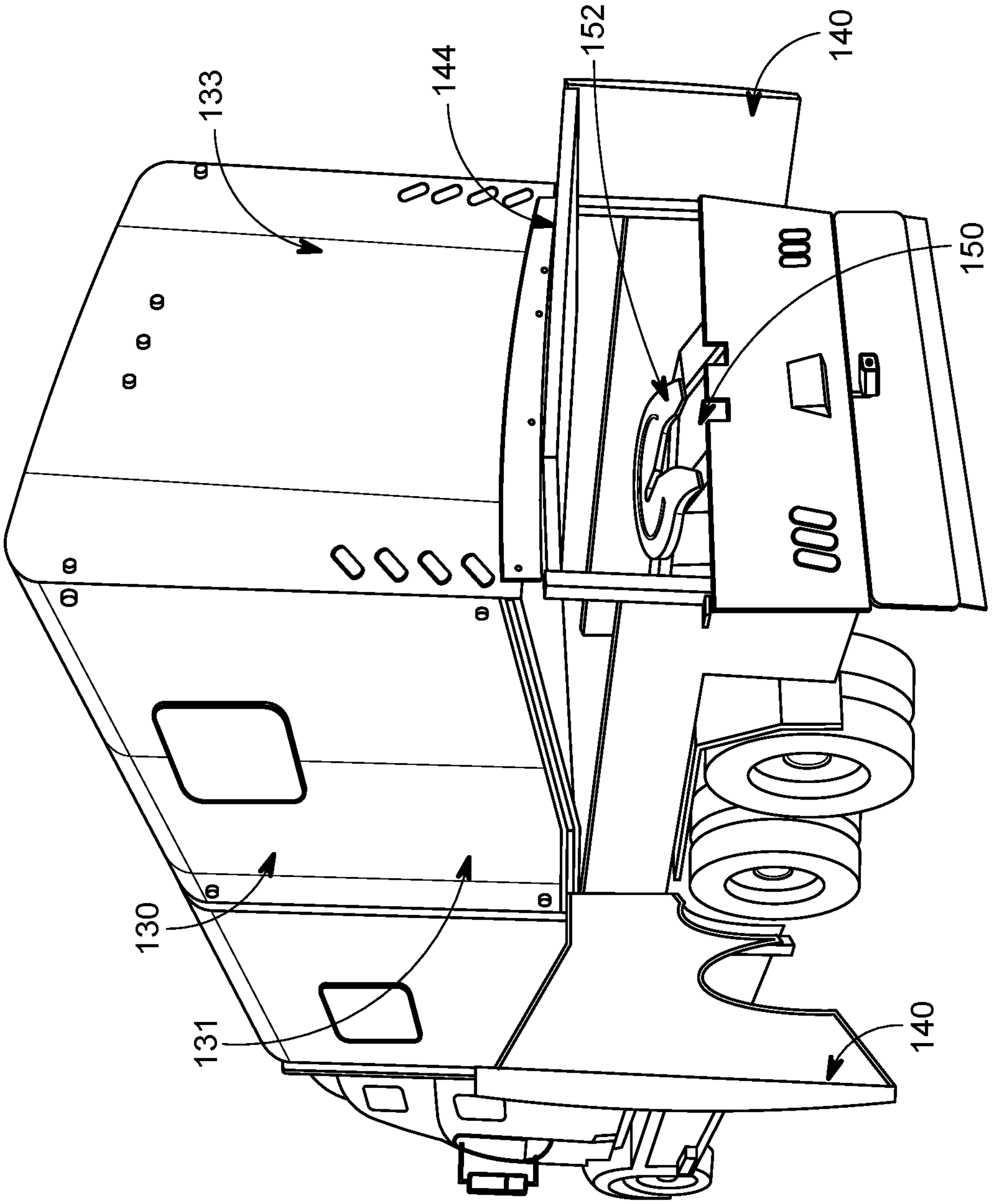
FIG. 3 is a rear view of a vehicle having an extended cab side panels in an open position.
Figure 5:
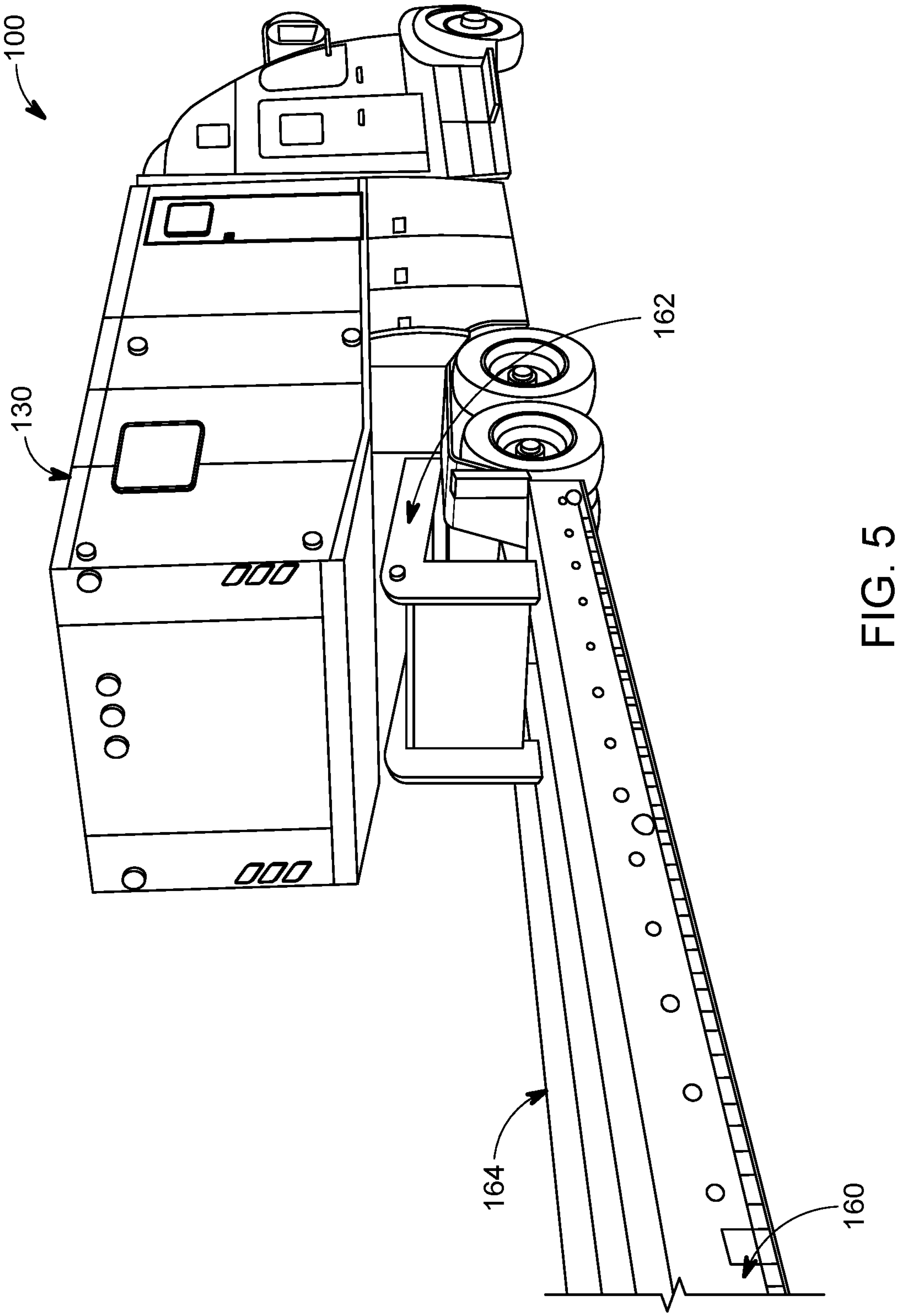
FIG. 5 is a rear view of a vehicle having an extended cab with a trailer attached.

With reference to exemplary embodiments shown in the photographs of FIGS. 2-4, the cab extension 130 optionally includes panels 140 on either or both sides of the cab extension, extending downward from the side walls or the bottom wall 132 of the cab extension 130. The side panels 140 may be vertically or horizontally hinged such that they may be configured between an open position (shown in FIGS. 3-5) and a closed position (shown in FIG. 2). In some embodiments, may slide, retract, or collapse to translate between the open and closed positions. The open position provides physical access to the underside of the cab extension 130 and the fifth wheel hitch 150. The closed position encloses the space/gap between the cab extension 130 and the fifth wheel hitch 150 to prevent physical access thereto. In some embodiments, the side panels 140 may be independently lockable to deter unauthorized access to the underside of the cab extension 130 and to the fifth wheel hitch 150. The side panels 140 may also be removable, or horizontally or vertically hinged as desired by the user (shown in FIG. 5).

The cab extension 130 may also include one or more rear panels 144 extending downward from the rear wall 133 or from the bottom wall of the cab extension. The rear panels 144 may be hinged such that they may be provided in an open position (shown in FIGS. 3-5) and a closed position (shown in FIG. 2). The open position provides physical access to the underside of the cab extension 130 and to the fifth wheel hitch 150. The closed position prevents physical access to the underside of the cab extension 130 and to the fifth wheel hitch 150. The rear panels 144 may be independently lockable in the closed position to deter unauthorized access to the underside of the cab extension 130 and to the fifth wheel hitch 150. The rear panel 144 may also be removable as desired by the user (as shown in FIG. 4).

As depicted in the exemplary embodiment shown in FIGS. 1-2, the cab extension may optionally feature one or more doors 136 and/or one or more windows 134. The doors 136 provide access solely to the cab extension 130, or may also provide access to the cab 120 of the vehicle 100. Doors 136 may be provided on a single side of the cab extension or on multiple sides of the cab extension. The optional windows 134 may be of any shape or size as desired by a user of the vehicle. Additional windows 134 may be positioned on the rear wall of the cab extension.

A method of making a cab extension is provided. The method includes providing a bottom wall having an angled portion, a top wall, and at least one side wall. The side wall extends from the bottom wall to the top wall, defining an interior space or volume for the cab extension. The cab extension is configured to be secured to a vehicle to provide an extended interior space for use by a user of the vehicle. The cab extension may be connectable to the vehicle chassis, the cab, or both. The cab extension may secured to the vehicle through welding portions of the cab extension to portions of the vehicle, bolts, clamps, crimping, adhesives, or combinations thereof. The cab extension may be permanently secured to the vehicle, or may be removably connected to the vehicle.

The method may include the installation of the cab extension on a vehicle. When installed, the angled portion of the bottom wall provides a hitch connection space between the bottom wall and a hitch mounted to the vehicle. The angled portion is angled with respect to a reference plane, such as a horizontal plane, though a plane defined by the trailer, the hitch, the vehicle, or another portion of the cab extension may also serve as the reference. The angled portion may be angled from 2-45 degrees, from 5-30 degrees, or from about 10-20 degrees. In some embodiments, the angled portion is angled at about 20 degrees from a horizontal reference plane when the cab extension is secured to a vehicle.

Once installed, the hitch connection space provides sufficient space for a trailer tongue to be inserted into the hitch connection space such that access to the hitch is provided to a connector on the trailer. It should be noted as well that the connector may be secured to the vehicle and the hitch may be positioned on the trailer. In either case, the hitch connection space provides a space below the cab extension that permits the trailer to be coupled to the vehicle by the hitch while the cab extension remains secured to the vehicle. It also provides sufficient space that the vehicle can be operated towing the trailer without the trailer contacting the cab extension.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms. As used herein, "longitudinal" is intended to mean along a longer axis and "transverse" is intended to mean perpendicular to longitudinal.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A vehicle comprising:

a chassis having a front end and an opposed rear end;

a cab supported by the chassis and positioned toward the chassis front end, the cab including an interior cab space;

a hitch supported by the chassis and positioned toward the chassis rear end; and a cab extension extending from the cab in a direction toward the chassis rear end, the cab extension having a bottom wall extending at least partially over the hitch to define a hitch connection space between the bottom wall of the cab extension and the chassis for receiving a portion of a trailer tongue, wherein at least a portion of the bottom wall of the cab extension extends at an angle with respect to a reference to form the hitch connection space to permit the trailer tongue to couple to the hitch.

2. The vehicle of claim 1, wherein the cab extension includes a side wall and a top wall to form an enclosed and interior cab extension space.

3. The vehicle of claim 2, wherein the interior cab extension space extends the interior cab space.

4. The vehicle of claim 2, wherein the side wall includes a door, the door configured to provide access to the interior cab extension space.

5. The vehicle of claim 1, wherein the reference is a horizontal line, a horizontal plane, a portion of the chassis, or a portion of the cab.

6. The vehicle of claim 5, wherein the angle is from about 5 degrees to about 30 degrees.

7. The vehicle of claim 5, wherein the angle is from about 10 degrees to about 20 degrees.

8. The vehicle of claim 1, wherein the cab extension includes at least one panel configured to be positioned in an open position and a closed position, the at least one side panel extending downward from the bottom wall of the cab extension when the at least one side panel is in the closed position.

9. The vehicle of claim 8, further comprising a hinged connection connecting the at least one panel to at least one or the chassis and the cab extension, the hinged connection configured to permit the at least one panel to hingedly move from the closed position to the open position.

10. The vehicle of claim 9, wherein the hinged connection is a vertical hinge connecting the at least one panel to the chassis.

11. The vehicle of claim 1, wherein the hitch is a fifth wheel hitch or a connector ball configured to couple with a gooseneck hitch.

12. The vehicle of claim 1, wherein the hitch is a fifth wheel hitch or a fifth wheel hitch connector, the hitch configured to couple with a corresponding fifth wheel hitch connector or with a fifth wheel hitch.

13. A cab extension comprising:

a bottom wall;

a top wall; and one or more side walls extending from the bottom wall to the top wall such that the bottom wall, the top wall, and the one or more side walls define an interior cab extension volume, wherein the cab extension is configured to define a hitch connection space below a portion of the bottom wall and above a trailer hitch when the cab extension is secured to a cab of a vehicle.

14. The cab extension of claim 13, wherein the cab extension is configured to be secured to a cab of a vehicle and, when the cab extension is secured to a cab of a vehicle, the angled portion of the bottom wall is angled at a first angle with respect to a reference plane.

15. The cab extension of claim 14, wherein the reference plane is a horizontal plane, a portion of the bottom wall, or a portion of the top wall.

16. The cab extension of claim 15, wherein the first angle is from about 5 degrees to about 30 degrees or from about 10 to about 20 degrees.

17. The cab extension of claim 13, wherein the portion of the bottom wall defining the hitch connection space is a majority of the bottom wall.

18. A method of making a cab extension, the method comprising:

providing a bottom wall, providing a top wall; and providing one or more side walls extending from the bottom wall to the top wall such that the bottom wall, the top wall, and the one or more side walls define an interior cab extension volume, and wherein the cab extension is configured to be secured to a cab of a vehicle having a trailer hitch, and, when the cab extension is secured to a cab of a vehicle, at least a portion of the bottom wall extends away from the cab such that the cab extension defines a hitch connection space between the trailer hitch and at least a portion of the bottom wall.

19. The method of claim 18, further comprising securing the cab extension to a cab of a vehicle having a trailer hitch.

20. The method of claim 19, wherein the hitch connection space is of sufficient size to accommodate a portion of a trailer tongue and permit a connector attached to a trailer tongue to couple with the trailer hitch.

* * * * *